(12) United States Patent
Neufeld

(10) Patent No.: US 6,502,775 B1
(45) Date of Patent: Jan. 7, 2003

(54) REVERSIBLE CRANK HANDLE FOR A FISHING REEL

(75) Inventor: Henry L. Neufeld, Tulsa, OK (US)

(73) Assignee: W. C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 09/901,497

(22) Filed: Jul. 7, 2001

(51) Int. Cl.$^7$ .................. A01K 89/00; A01K 89/01; A01K 89/015
(52) U.S. Cl. .................................. 242/282; 74/545
(58) Field of Search .................. 42/282, 283, 284; 74/545

(56) References Cited

U.S. PATENT DOCUMENTS

| | | | | |
|---|---|---|---|---|
| 4,674,698 A | * | 6/1987 | Carpenter | 242/282 |
| 4,725,018 A | * | 2/1988 | Young | 242/282 |
| 5,518,194 A | * | 5/1996 | Jeung | 242/282 |
| 5,690,289 A | | 11/1997 | Takeuchi et al. | |

* cited by examiner

*Primary Examiner*—Emmanuel Marcelo
(74) *Attorney, Agent, or Firm*—Fellers, Snider, Blankenship, Bailey & Tippens, P.C.

(57) ABSTRACT

A reversible crank handle system for a fishing reel which eliminates rotation free-play between the crank handle and a drive gear. Preferably, the inventive reversible crank handle system includes: a drive gear having a passageway there through, each end of the passageway terminating in a notch; a crankshaft receivable through the passageway, the crankshaft including a crank handle affixed to one end of the crankshaft and a wedge receivable in either notch. When a retainer is tightened to secure the crankshaft in the fishing reel, the wedge is drawn into the notch thereby nonrotatably engaging the crankshaft and the drive gear. The tapered nature of the notch and wedge eliminate rotational free-play between the crank handle and the drive gear to eliminate unintentional loosening of the retainer.

6 Claims, 6 Drawing Sheets

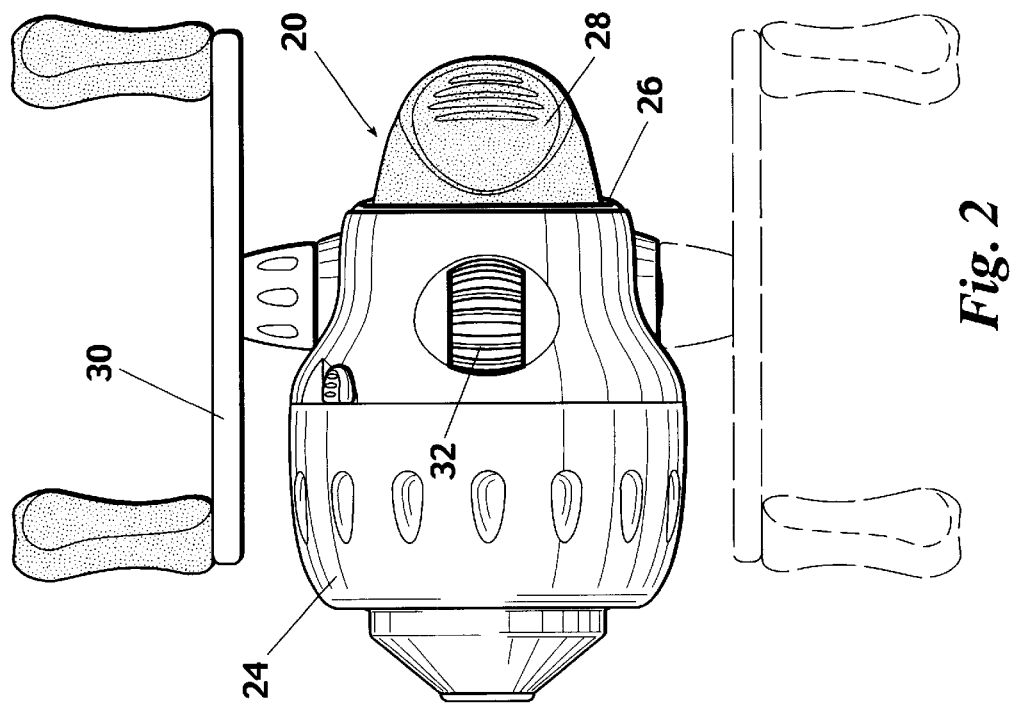
Fig. 2
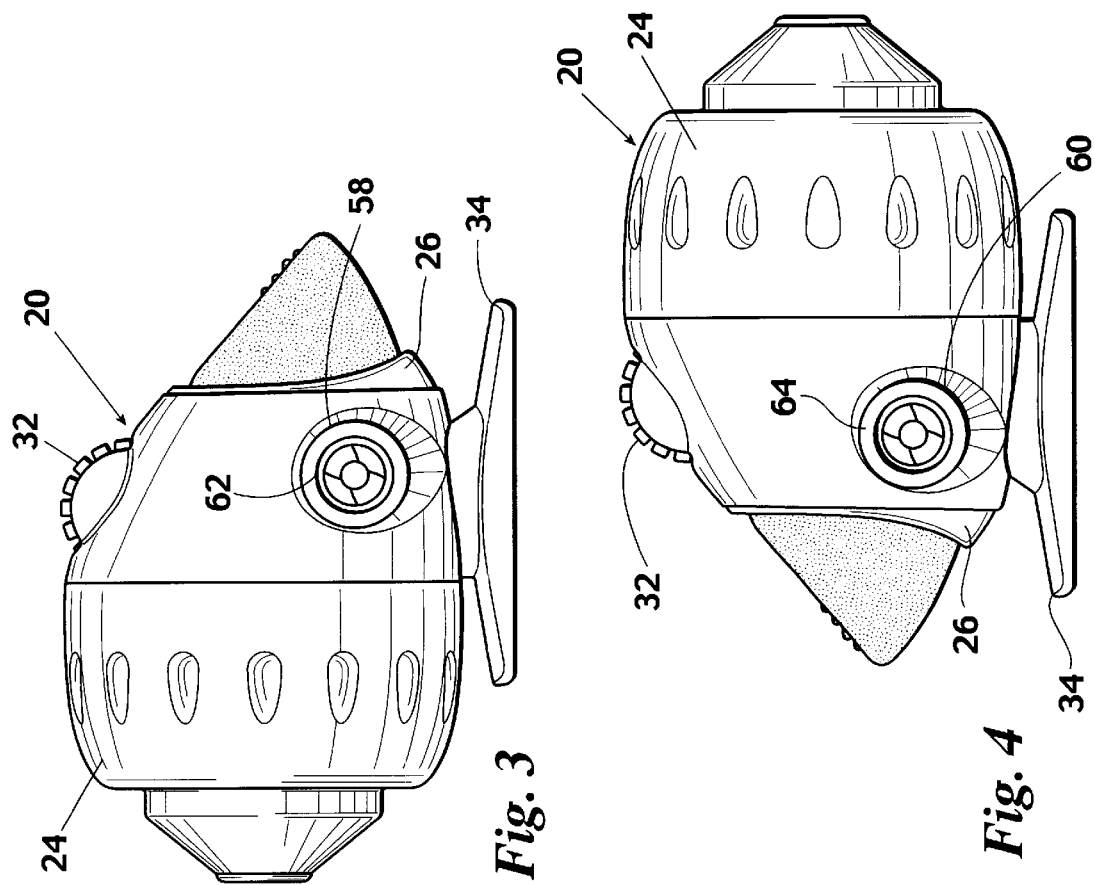
Fig. 3
Fig. 4

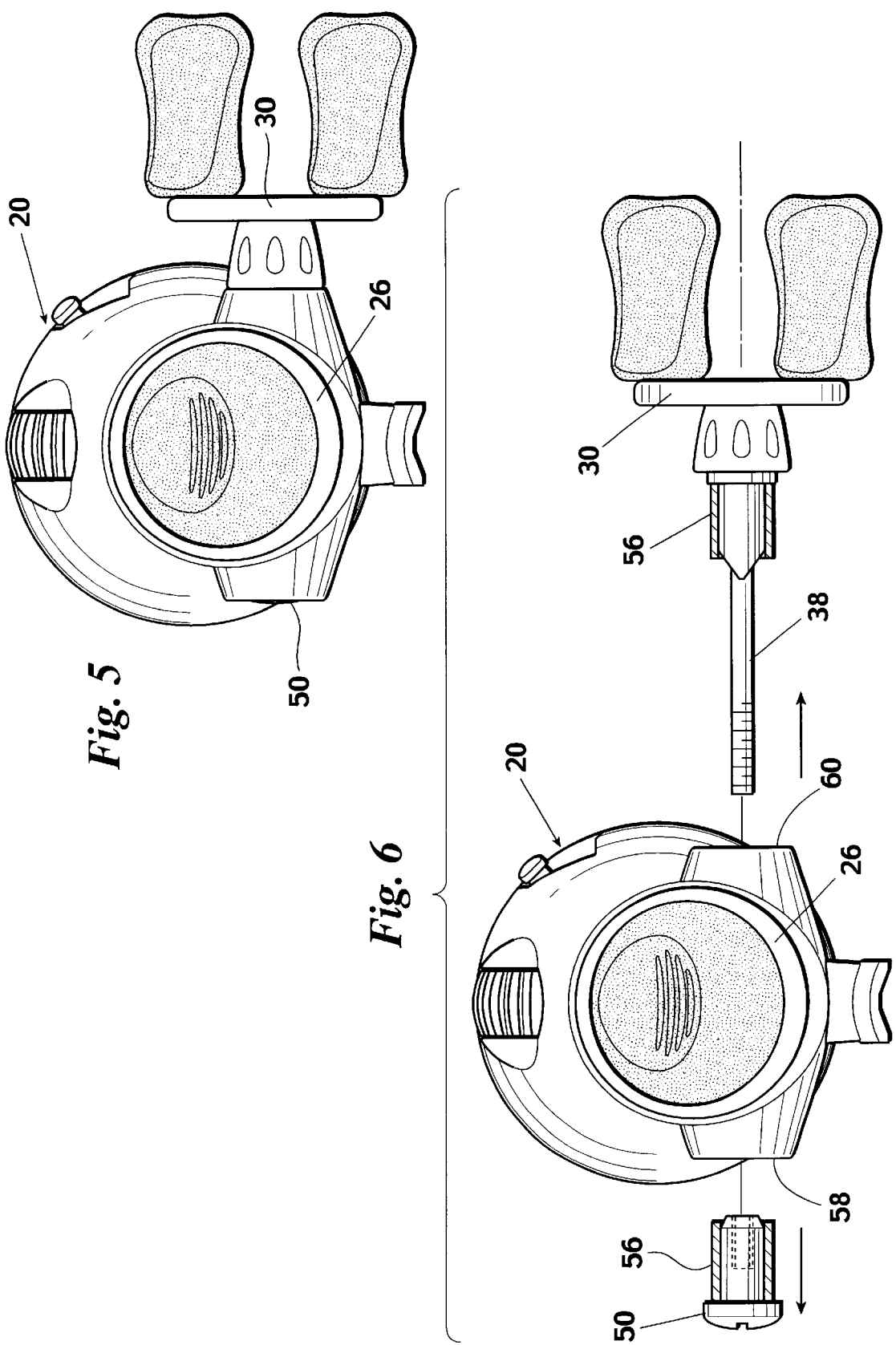

REVERSIBLE CRANK HANDLE FOR A FISHING REEL

BACKGROUND OF THE INVENTION

1. Field of the Invention

The present invention relates to a reversible crank handle for fishing reels. More particularly, but not by way of limitation, the present invention relates to a reversible crank handle for a fishing reel which exhibits little or no free-play to eliminate unwanted loosening of the securing member for the crank handle.

2. Background of the Invention

Generally speaking, fishing reels are manufactured either in right-handed and left-handed models, or in a reversible configuration whereby the crank handle may be installed from either side to accommodate any user.

In a typical reversible reel, a crank handle is attached to one end of a crankshaft. The crankshaft is provided with a polygonal cross section which is nonrotatably received through a drive gear which includes a passageway of a similar polygonal cross section. A threaded portion is provided at the end of the crankshaft opposite the crank handle to receive a retainer to secure the crank handle and crank shaft to the reel. The reel is then configured such that the crankshaft may be inserted from either side of the drive gear.

A problem that arises with a reel constructed in this fashion is free-play of the crank handle. Either clearance is provided between the passageway through the drive gear and the crankshaft to facilitate assembly of the reel and reversing of the crank handle or the mating parts are known to wear. In either case, free-play is introduced between the crankshaft and the drive gear. This free-play results in "hammering" of the crankshaft as the fisherman works the crank handle, ultimately causing the retainer at the opposite end of the crankshaft to loosen.

While reversible crank handles are well known in spinning reels, they are presently not widely available in other types of fishing reels, particularly spincast type fishing reels. Spincast reels are well known in the art. A spincast reel will typically include: a central body or frame; a front cover positionable over at least the front face of the frame and having a tapered forward wall; a back cover positionable over at least the back face of the frame; a casting button operably projecting from the back cover; and a crank handle extending from the side of the fishing reel. Most of the reel's operating structures and operating mechanisms are either mounted on, formed on, or mounted through the frame. As discussed hereinbelow, the crank handle is operable for winding a fishing line around a line spool contained within the spincast reel. The line spool is typically mounted on a spool hub projecting forwardly from the front of the frame.

A spincast reel will also include a foot structure for securing the reel on a fishing rod. The foot structure typically extends from either the bottom of the frame or the bottom of the back cover. Spincast reels having the foot extending from the bottom of the back cover are typically constructed such that, when the reel is assembled, the frame is almost completely housed within the front and back covers.

The operating structures and mechanisms contained in a spincast reel typically include: an elongate, main shaft slidably and rotatably extending through the frame and through the spool hub; a spinnerhead secured to the forward end of the main shaft; a pinion gear positioned around the main shaft; a crankshaft extending from the crank handle into the side of the reel and through a crankshaft boss provided on the rearward face of the frame; a drive gear (e.g., a face gear) secured on the interior end of the crankshaft; an anti-reverse mechanism (e.g., a ratchet/pawl-type mechanism) associated with the crankshaft for preventing reverse rotation of the crank handle and crankshaft; and an adjustable drag system.

SUMMARY OF THE INVENTION

The present invention provides a reversible crank handle for a fishing reel which satisfies the needs and alleviates the problems mentioned above. The inventive reversible crank handle includes a wedge which interfaces a mating notch in the drive gear from the crank handle side and a retainer which includes a frusto-conical end to interface the opposite side of the drive gear.

In one aspect, the engagement between the wedge of the inventive crank handle and the notch of the drive gear reduces or eliminates rotational free-play between crankshaft and the drive gear to prevent unwanted loosening of the retainer.

In another aspect, the inventive reversible crank handle system is provided in a spincast fishing reel comprising: a body structure having a drive gear supporting structure; a pair of bearings received in the supporting structure to rotatably support the drive gear; a crank handle assembly receivable through the supporting structure and drive gear from either side of the reel; and a retainer receivable on the crank handle assembly for retaining the crank handle in the reel. The inventive crank handle assembly includes: a crank handle; a crank shaft extending from the crank handle and having a threaded portion on the end opposite the crank handle; and a wedge for non-rotatably engaging a notch provided on the drive gear.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 2 provides a top plan view of a spincast reel showing the crank handle in alternate positions.

FIG. 3 provides a plan view of the left side of the spincast reel with the crank handle removed.

FIG. 4 provides a plan view of the right side the spincast reel with the crank handle removed.

FIG. 5 provides a rear view of the spincast reel with the crank handle positioned on the right side of the reel.

FIG. 6 provides a rear view of the spincast reel showing removal of the crank handle assembly from the right side of the reel.

DESCRIPTION OF THE PREFERRED EMBODIMENTS

Figure 1:
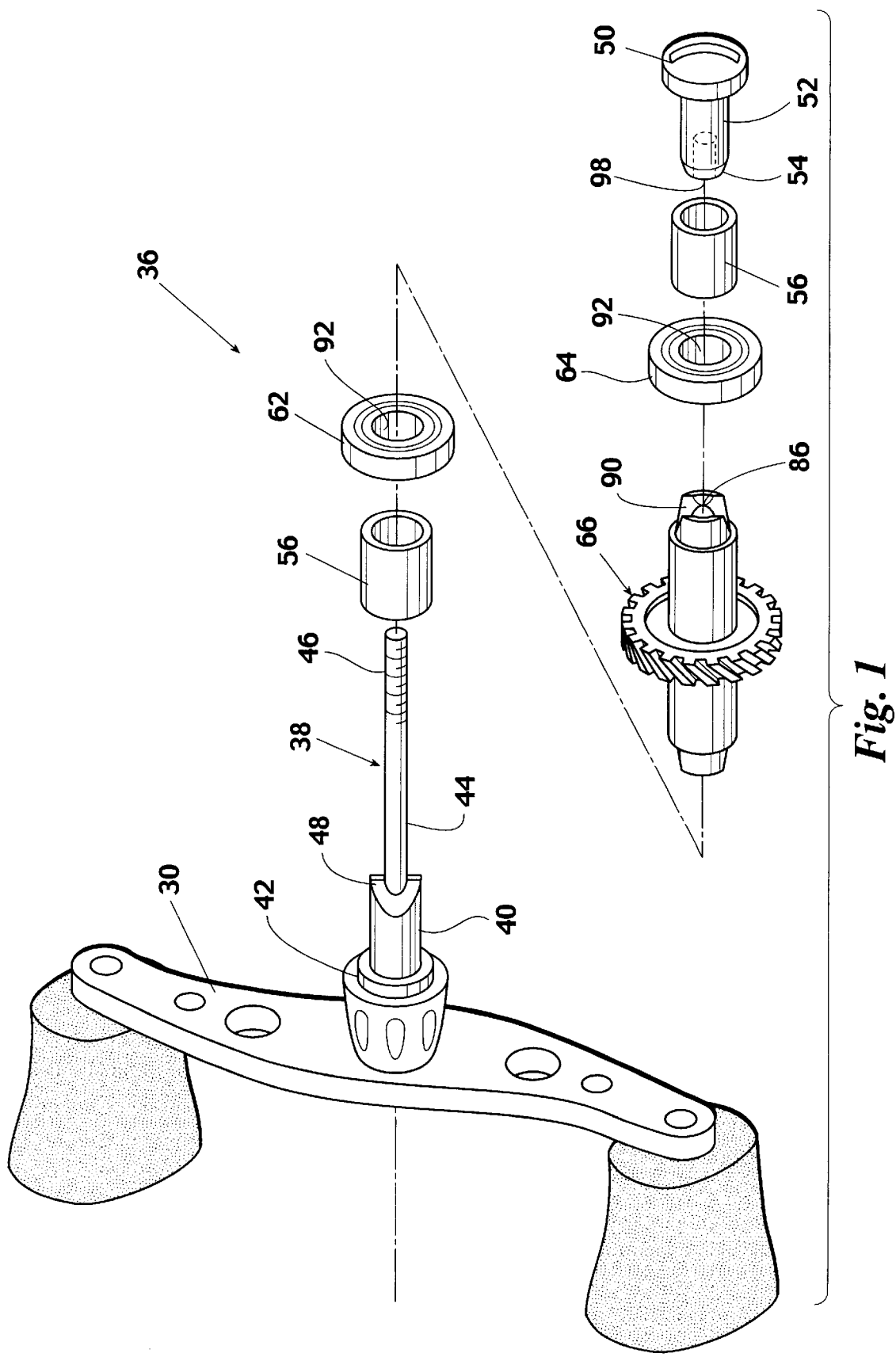
FIG. 1 provides an exploded perspective view of the inventive crank handle assembly.
Figure 7:
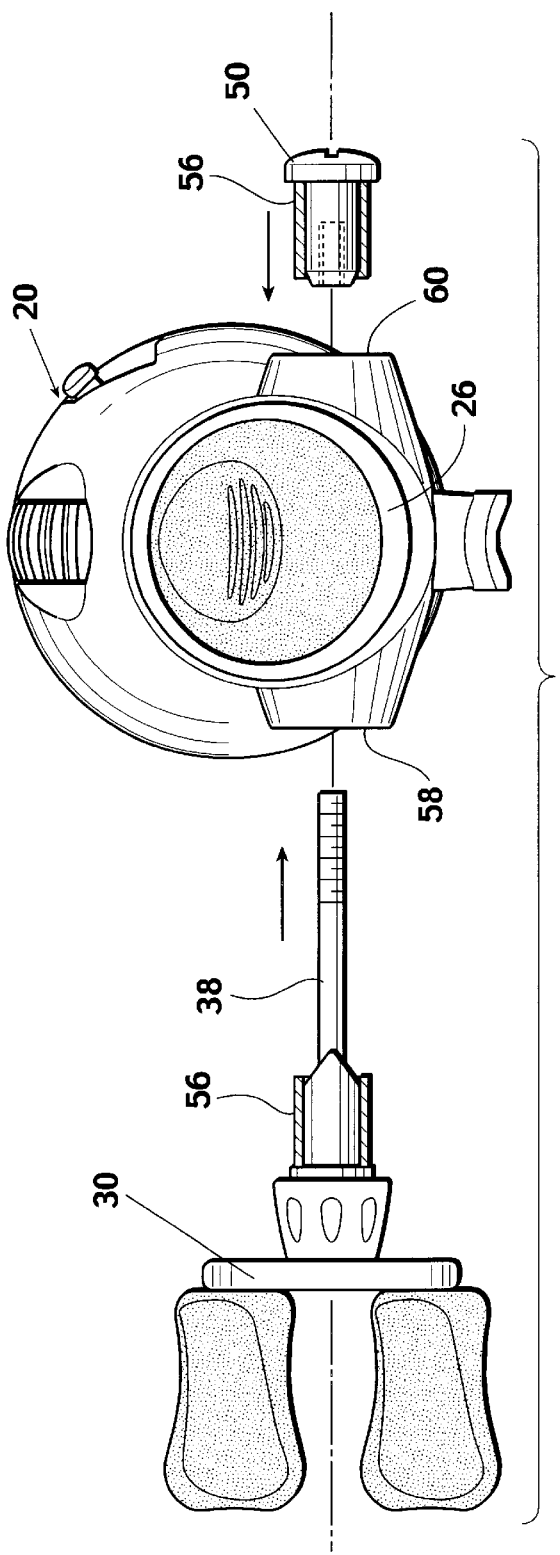
FIG. 7 provides a rear view of the spincast reel showing insertion of the crank handle assembly from the left side of the reel.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a preferred embodiment of a spincast reel 20 having the inventive reversible crank handle is shown in FIG. 2. Preferably, spincast reel 20 comprises: body structure 22 (FIG. 9); front cover 24 removably attached to the front of body structure 22; back cover 26 removably attached to the back of body structure 22; actuator button 28 accessible from behind back cover 26; reversible crank handle 30 extending from the side of rear cover 26; and drag wheel 32 protruding through the top of rear cover 26. Reversible crank handle 30 is shown in FIG. 2 in its right handed position while the left-handed position of crank handle 30 is shown in phantom.

As will become apparent to those skilled in the art, while the inventive reversible crank handle is shown and described in its preferred embodiment as incorporated in a spincast reel, the invention is not so limited. The inventive reversible crank handle is suitable for use with other types of fishing reels, for example, spinning type fishing reels.

Referring next to FIG. 3, reel 20 also includes reel foot 34 extending from the bottom of body structure 22 for mounting reel 20 on a fishing rod.

Referring to FIG. 1, crankshaft 38 preferably includes: an inner shoulder 40 located proximate one end of crank shaft 38 and having wedge 48 formed at its inner end; an outer shoulder 42 disposed between crank handle 30 and inner shoulder 40; an elongated cylindrical portion 44; and a threaded portion 46 located at the end of crankshaft 38 opposite shoulders 40 and 42.

Continuing with FIG. 1, the inventive crank handle assembly 36 includes: crankshaft 38; crank handle 30 non-rotatably affixed to one end of crankshaft 38; a retaining screw 50 having inside threaded cavity 98 receivable on threaded portion 46, a shoulder 52, and frusto-conical portion 54; and a pair of bushings 56 received over shoulders 40 and 52.

Figure 9:
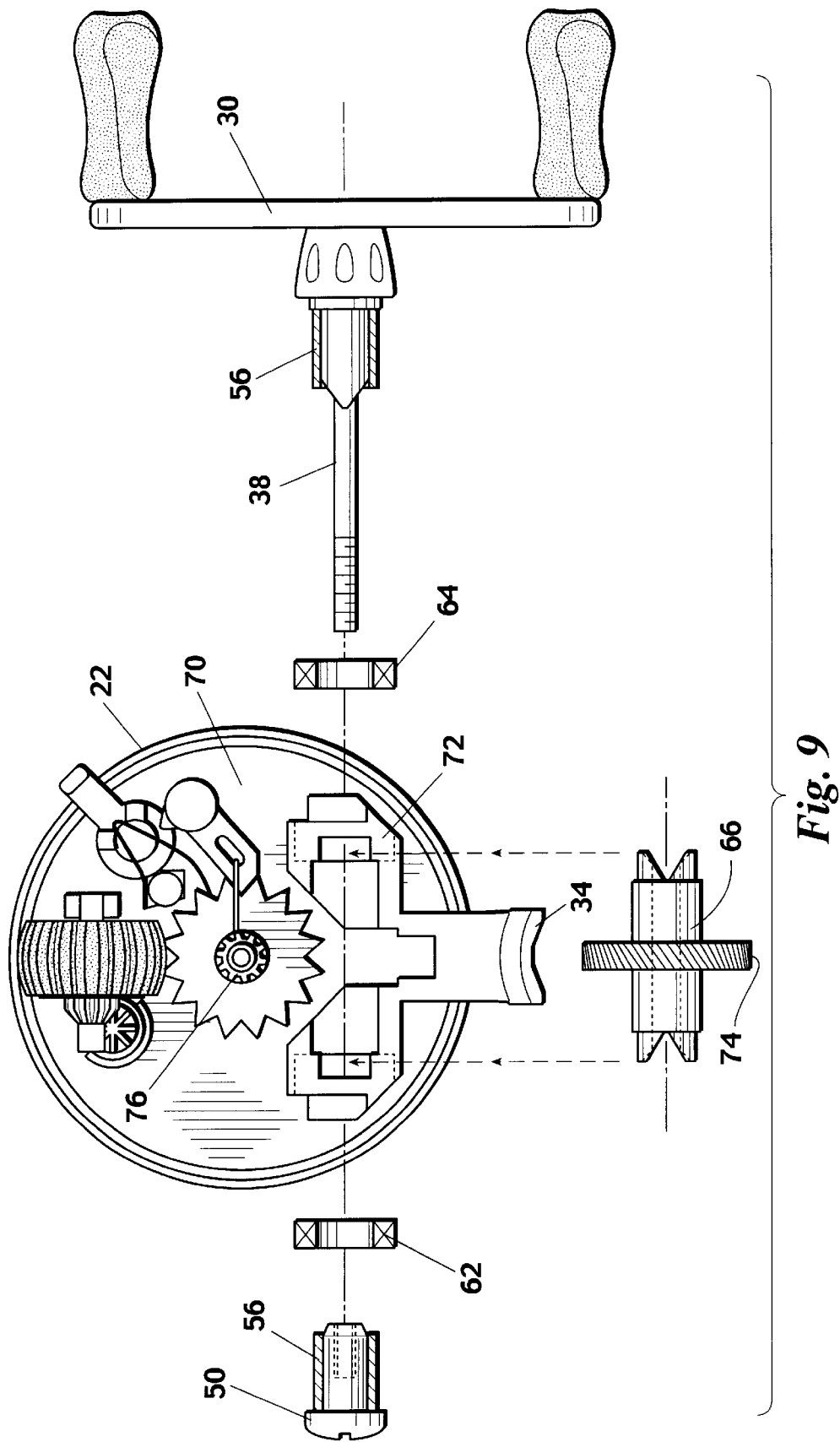
FIG. 9 provides an exploded rear view of the spincast reel with the back cover removed.
Figure 11:
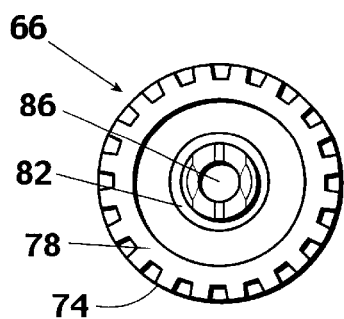
FIG. 11 provides a side view of the inventive drive gear for use with the reversible crank handle assembly.
Figure 12:
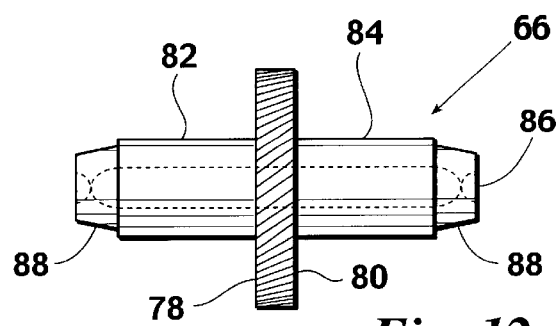
FIG. 12 provides a top view of the drive gear with the notches oriented horizontally.
Figure 13:
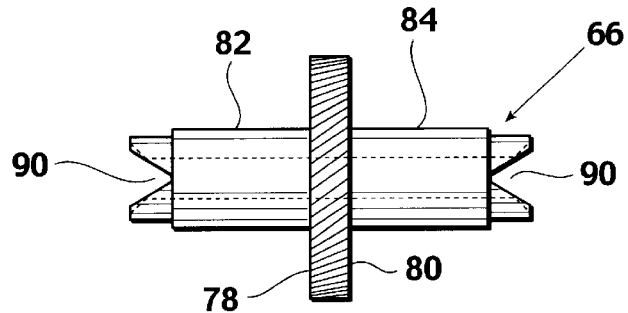
FIG. 13 provides a top view of the drive gear with the notches oriented vertically.
Figure 10:
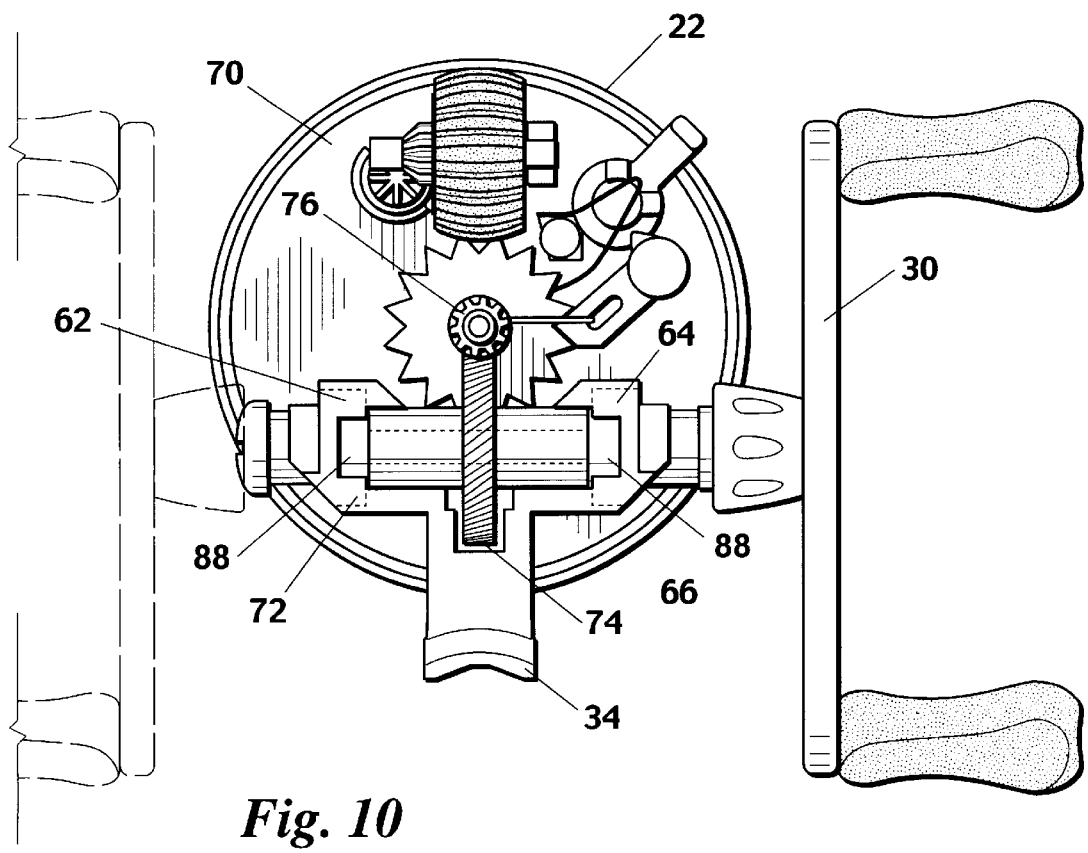
FIG. 10 provides a rear view of the spincast reel with the back cover removed and the crank handle assembly positioned on the right side of the reel.

Referring now to FIGS. 9 and 10, body structure 22 includes a back face 70. Drive gear support 72 extends rearwardly from back face 70 to retain drive gear 66, bearing 62, and bearing 64 in proper alignment. Drive gear 66 includes gear portion 74 for meshing with pinion gear 76. As best seen in FIGS. 11, 12, and 13, drive gear 66 also includes: a left face 78; a right face 80; a left shoulder 82 extending from left face 78; a right shoulder 84 extending from right face 80; and a passageway 86 extending through drive gear 66 for receiving crankshaft 38 (FIG. 1). Left and right shoulders 82 and 84, respectively, include engaging portions 88. Each engaging portion 88 includes a notch 90 for receiving wedge 48 (FIG. 1) when the crank handle is inserted from that particular side.

Referring to FIGS. 2, 3, and 4, reel 20 can receive crankshaft 38 (FIG. 1) from either side. Aperture 58 is provided on the left side of back cover 26 for receiving crankshaft 38 in a left-handed configuration and aperture 60 is provided on the right side of back cover 26 for receiving crankshaft 38 in a right-handed configuration. As will be apparent to those skilled in the art, most preferably, apertures 58 and 60 are substantially identical. Referring also to FIG. 10, when reel 20 is assembled, drive gear 66 is first inserted in support 72, next bearings 62 and 64 are inserted into support 72 from the left and right sides, respectively, and receive engaging portions 88 to retain drive gear 66 in support 72.

Referring again to FIG. 1, when handle assembly 36 is assembled into reel 20, crankshaft 38 passes through bearing 62, drive gear 66, and bearing 64. Wedge 48 is received in a notch 90 (FIG. 13) on either left shoulder 82 or right shoulder 84 and the frusto-conical portion 54 of retainer 50 is received in passage way 86 on the other shoulder 82 or 84. As will be apparent to those skilled in the art, three functions are provided by the engagement of wedge 48 and notch 90. First, the shapes of wedge 48 and notch 90 provide non-rotatable engagement to provide rotation of the drive gear 66 when crank handle 30 is turned. In addition, the tapered nature of both wedge 48 and notch 90 will eliminate rotational free-play between crank handle 30 and drive gear 66 as the components are drawn together by retainer 50. Finally, as wedge 48 is drawn into notch 90 the outer walls of engaging portion 88 will be forced slightly outward to snug engaging portion 88 in the inner race 92 of bearing 62 or 64, depending from which side of the reel crankshaft 38 is inserted. Likewise, the frusto-conical portion 54 of retainer 50 is received in passageway 86 and, as retainer 50 is tightened, forces the outer walls of engaging portion 88 outward, snugging engaging portion 88 in the inner race 92 of the other bearing 62 or 64. Forcing engaging portions 88 into contact with bearings 62 and 64 reduces radial free-play of crank handle 30 to improve the feel of reel 20 to the fisherman and to likewise reduce hammering which could otherwise result in the unintentional loosening of fastener 50.

Referring next to FIGS. 5–8, to move crank handle 30 from the right side to the left side, retainer 50 is first loosened, preferably with a screw driver, coin, or the like, and removed from aperture 58 in the left side of back cover 26 with bushing 56 in place. Next, the crank handle 30 and crankshaft 38 are removed from aperture 60 in the right side of back cover 22 with bushing 56 in place. Crankshaft 38 is then inserted, as indicated by arrow 94, into aperture 58 in the left side of back cover 26 and retainer 50 is inserted, as indicated by arrow 96, into aperture 60 in the right side of back cover 26 and tightened with a screwdriver, coin, or the like, until rotational free-play is eliminated.

Figure 8:
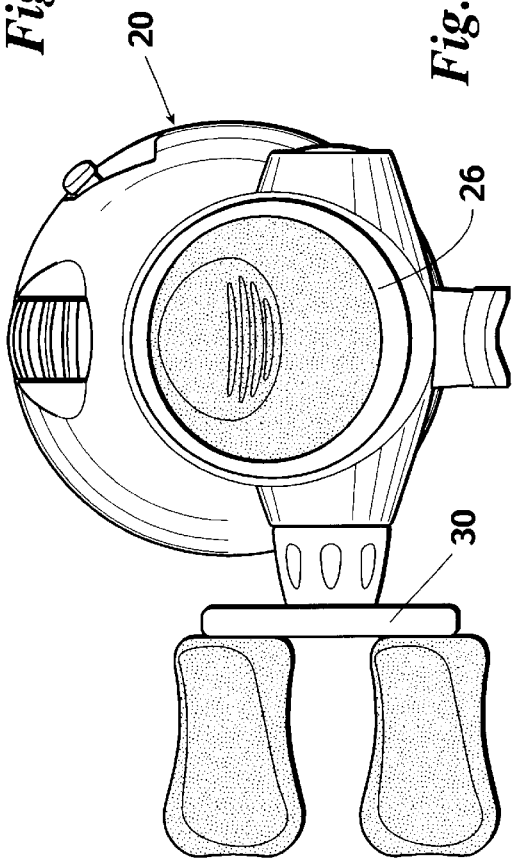
FIG. 8 provides a rear view of the spincast reel with the crank handle positioned on the left side of the reel.

The above described process is simply reversed to change reel 20 from a left-handed configuration (as shown in FIG. 8) to a right-handed configuration (as shown in FIG. 5).

Numerous changes or modifications are possible to the preferred embodiment. By way of example and not limitation: the wedge portion could engage a notch formed in the face of the drive gear, eliminating shoulders 82 and 84; the threaded portion 46 could be provided as an inside thread in the crankshaft to engage an outside thread on the retainer 50; shoulders 40 and 52 could be sized to eliminate bushings 56; etc. These, as well as other such changes or modifications, are encompassed within the scope of the present invention.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A reversible crank handle system for a fishing reel comprising:
   a drive gear rotatably mounted in the fishing reel, said drive gear having:
      a first face;
      a second face;
      a passageway extending through said drive gear between said first face and said second face;
      a first tapered notch coaxial with said passageway and located at a first end of said passageway;
      a second tapered notch coaxial with said passageway and located at a second end of said passageway
   a crankshaft including:
      an elongate portion receivable through said passageway;
      a crank handle nonrotatably affixed to a first end of said crankshaft;
      a wedge coaxial with said elongate portion,
   wherein, when said elongate portion is inserted through said passageway from said first end of said passageway, said wedge will engage said first notch and when said elongate portion is inserted through said passageway from said second end of said passageway, said wedge will engage said second notch.

2. The reversible crank handle system of claim 1 wherein said crankshaft includes a first threaded portion and further comprising:
   a retainer including:
      a second threaded portion receivable on said first threaded portion; and
      a frusto-conical portion at an end of said retainer,
   wherein, when said second threaded portion is received on said first threaded portion, said frusto-conical portion will be received in said passageway.

3. The reversible crank handle system of claim 1 wherein said drive gear further includes:
   a first engaging portion extending from said first face, said passageway extending through said first engaging portion and terminating at said first notch; and
   a second engaging portion extending from said second face, said passageway extending through said second engaging portion and terminating at said second notch.

4. The reversible crank handle system of claim 3 further comprising:
   a first bearing secured in the fishing reel to receive said first engaging portion; and
   a second bearing secured in the fishing reel to receive said second engaging portion,
   wherein, when said wedge is received in either said first notch or said second notch, the corresponding engaging portion will spread to tighten said engaging portion in its corresponding bearing.

5. The reversible crank handle system of claim 4 wherein said crankshaft includes a first threaded portion and further comprising:
   a retainer having:
      a second threaded portion receivable on said first threaded portion; and
      a frusto-conical portion at an end of said retainer,
   wherein, when said second threaded portion is received on said first threaded portion, said frusto-conical portion will be received in said passageway and contact either said first engaging portion or said second engaging portion and the engaging portion in contact with said frusto-conical portion will spread to tighten said engaging portion in its corresponding bearing.

6. In a spincast fishing reel of the type having a line spool for storing a fishing line, a spinner head rotatably mounted inside a cover of the fishing reel for rewinding the fishing line onto the spool, a pinion gear non-rotatably connected to the spinner head, a drive gear in meshing engagement with the pinion gear, a crankshaft in nonrotatable engagement with the drive gear, the crankshaft including a crank handle for turning the drive gear to rewind the fishing line onto the spool, the improvement comprising:
   one of a first tapered female member and first tapered male member in communication with a first side of the drive gear;
   one of a second tapered female member and a second tapered male member in communication with a second side of the drive gear; and
   one of a tapered female member and a tapered male member non-rotatably affixed to the crankshaft for selectively and cooperatively engaging said one of a first tapered female member and one a first tapered male member when located for communication with a first side of said drive gear and for selectively and cooperatively engaging said one of a second tapered female member and a second tapered male member when located for communication with a second side of the drive gear.

* * * * *